US012663703B2

(12) United States Patent (10) Patent No.: US 12,663,703 B2

Chang et al. (45) Date of Patent: Jun. 23, 2026

(54) STRUCTURED LIGHT PROJECTION SYSTEM

(71) Applicant: Quanta Computer Inc., Taoyuan City (TW)

(72) Inventors: Jung-Wen Chang, Taoyuan City (TW); Chin-Kang Chang, Taoyuan City (TW); Chao-Ching Huang, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 323 days.

(21) Appl. No.: 18/460,862

(22) Filed: Sep. 5, 2023

(65) Prior Publication Data

US 2025/0020988 A1 Jan. 16, 2025

(30) Foreign Application Priority Data

Jul. 11, 2023 (TW) .................................. 112125825

(51) Int. Cl.
*G03B 21/20* (2006.01)
*G03B 17/54* (2021.01)
*G03B 21/64* (2006.01)

(52) U.S. Cl.
CPC ........... *G03B 21/208* (2013.01); *G03B 17/54* (2013.01); *G03B 21/2033* (2013.01); *G03B 21/64* (2013.01)

(58) Field of Classification Search
None
See application file for complete search history.

(56) References Cited

U.S. PATENT DOCUMENTS 6,377,400 B1 * 4/2002 Hollander ............ G02B 27/106
359/618
2001/0043313 A1 * 11/2001 Okura .................. G03B 21/001
353/97

FOREIGN PATENT DOCUMENTS

CN          114779487 A  *  7/2022  ............. H04N 23/56
CN          110891471 B  *  11/2022  ............. A61B 1/06
WO     WO-2018229834 A1 *  12/2018  ............. A61B 1/07

* cited by examiner

*Primary Examiner* — Bao-Luan Q Le
*Assistant Examiner* — Danell L Owens
(74) *Attorney, Agent, or Firm* — McClure, Qualey & Rodack, LLP

(57) ABSTRACT

A structured light projection system is provided. The structured light projection system includes a condenser lens group, a light source, a mask, an imaging component, and a holder. The condenser lens group includes a first end and a second end. The light source is disposed on the first end of the condenser lens group. The light source emits a light. The imaging component projects the light passing through the mask onto a target element. The holder is disposed on the second end of the condenser lens group. The holder holds the mask and the imaging component. The light emitted by the light source sequentially passes through the condenser lens group, the mask, and the imaging component.

9 Claims, 5 Drawing Sheets

1000

STRUCTURED LIGHT PROJECTION SYSTEM

CROSS REFERENCE TO RELATED APPLICATIONS

This application claims priority of Taiwan Patent Application No. 112125825, filed on Jul. 11, 2023, the entirety of which is incorporated by reference herein.

BACKGROUND OF THE INVENTION

Field of the Invention

The present invention relates to a structured light projection system, and, in particular, to a structured light projection system using a light-emitting diode (LED) as a light source.

Description of the Related Art

Structured light scanning is one of the current three-dimensional scanning methods that are most commonly used, and its equipment generally includes an image capture element and a light source system capable of projecting a specific pattern. In the prior art, the light source system generally uses a laser as a light source, and projects a specific pattern through a diffractive optical element (DOE).

However, one of the drawbacks of using the above method to create specific patterns lies in the significant distortion of the image, a noticeable laser center spot, and uneven overall brightness. The aforementioned issues not only result in suboptimal optical effects for structured light scanning but also impact subsequent software-based interpretations. Moreover, in the aspect of designing projection patterns, projecting specific patterns through diffractive optical elements requires prior derivation of wave optics equations based on the diffractive optical element, making the process relatively complex. Therefore, there is a need for a method that addresses the aforementioned problems and simplifies the design of projection patterns, in order to streamline the complex process and achieve enhanced optical effects.

BRIEF SUMMARY OF THE INVENTION

The invention provides a structured light projection system, including a condenser lens group, a light source, a mask, an imaging component, and a holder. The condenser lens group includes a first end and a second end. The light source is disposed on the first end of the condenser lens group. The light source emits a light. The imaging component projects the light passing through the mask onto a target element. The holder is disposed on the second end of the condenser lens group. The holder holds the mask and the imaging component. The light emitted by the light source sequentially passes through the condenser lens group, the mask and the imaging component.

According to some embodiments of the present disclosure, the light source is a light-emitting diode.

According to some embodiments of the present disclosure, the structured light projection system further includes an image capture element disposed near the holder to receive the light reflected from the target element.

According to some embodiments of the present disclosure, the mask includes a transparent area and a shielding area. The transparent area allows the light to pass through.

The shielding area blocks the light from passing through, so that the light passing through the mask forms a specific pattern.

According to some embodiments of the present disclosure, the specific pattern formed by the light passing through the mask is a stripe pattern or a checkerboard pattern.

According to some embodiments of the present disclosure, the shielding area of the mask is coated with chromium metal.

According to some embodiments of the present disclosure, the condenser lens group further includes a first area, a second area, a first lens and a second lens. The light source and the first lens are at opposite ends of the first area. The first lens and the second lens are at opposite ends of the second area.

According to some embodiments of the present disclosure, the holder includes a receiving portion. The receiving portion accommodates the second end of the condenser lens group.

According to some embodiments of the present disclosure, the holder further includes a first holding portion and a second holding portion. The first holding portion holds the mask. The second holding portion holds the imaging component. The first holding portion is adjacent to the second holding portion. The second holding portion and the receiving portion are located on opposite sides of the holder.

According to some embodiments of the present disclosure, the imaging component includes an imaging lens group and a fixed portion. The imaging lens group includes a thread. The thread is in contact with the fixed portion. The imaging lens group is movable relative to the fixed portion with the thread.

BRIEF DESCRIPTION OF THE DRAWINGS

The present disclosure will be better understood from the following description of the embodiments with reference to the accompanying drawings.

Figure 1:
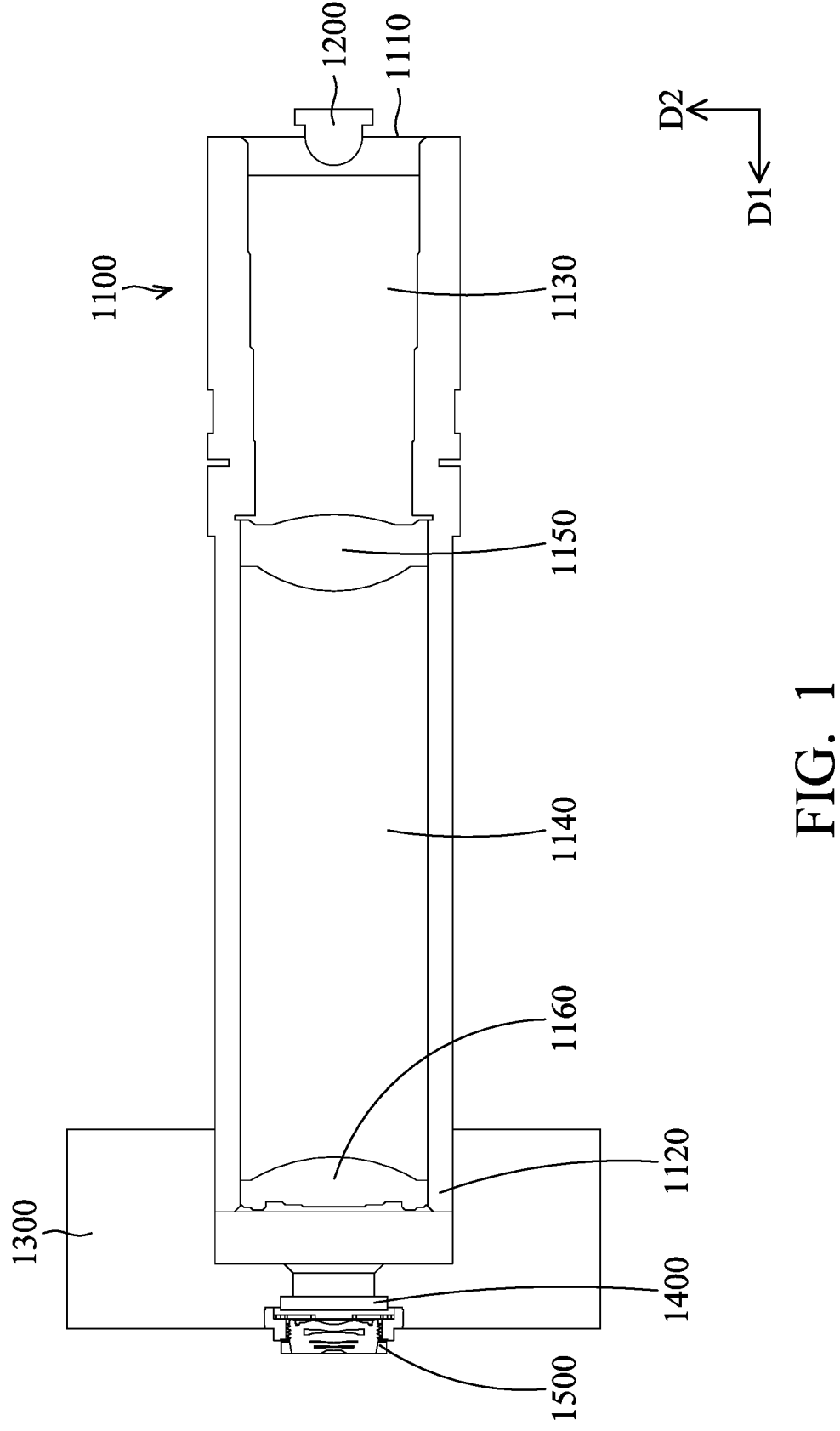
FIG. 1 shows a cross-sectional view of a structured light projection system according to some embodiments of the present disclosure.

The disclosure is susceptible to various modifications and alternative forms. Some representative embodiments have been shown, by way of example, in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the claims.

DETAILED DESCRIPTION OF THE INVENTION

The various embodiments are described with reference to the drawings, wherein like reference numerals are used to designate similar or equivalent elements throughout. The drawings are not drawn to scale and are provided solely to illustrate the invention. It should be understood that numerous specific details, relationships, and methods are set forth in order to provide a comprehensive understanding. It will be readily apparent, however, to one of ordinary skill in the art that the various embodiments may be practiced without one or more of the specific details or otherwise. In other instances, well-known structures or operations are shown in detail to avoid obscuring certain features of various embodiments. The various embodiments are not limited by the order of acts or events shown, as some acts may occur in different orders and/or concurrently with other acts or events. Furthermore, not all illustrated acts or events may be required to implement a methodology in accordance with the invention.

Elements and limitations disclosed, such as in the abstract, summary, and detailed description, but not explicitly stated in the claims, should not be incorporated by implication, inference, or any other means, either individually or collectively, into the claims. For the purpose of this embodiment, the term "singular" includes the "plural" and vice versa, unless expressly stated otherwise. The term "including" means "including without limitation". Additionally, terms like "about, almost, substantially, approximately", and their similar counterparts may be used here to signify concepts like "at", "near, nearly at", "within 3% of", "within a range of 3-5%", "within acceptable manufacturing tolerances", or any logical combination thereof.

Structured light projection is an optical technique that obtains three-dimensional information about an object's shape, contour, or surface texture by projecting a specialized light pattern onto the object's surface. Structured light typically employs light projection systems and cameras to capture the alterations induced by the projected light pattern. Software, such as image processing tools, is then used for analysis and reconstruction. The structured light projection system 1000 of the present invention is described in detail below.

Figure 5:
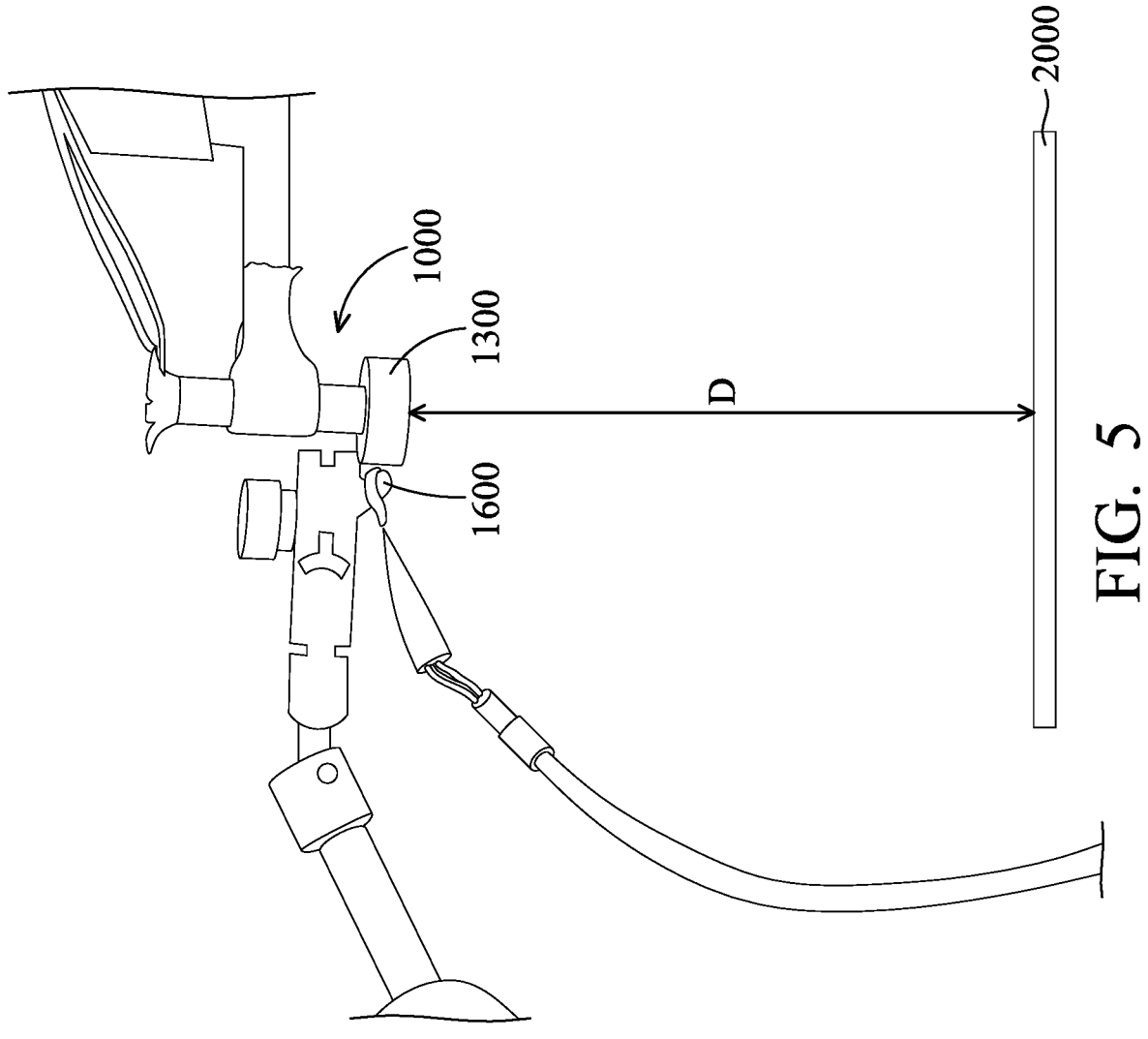
FIG. 5 is a schematic diagram of a structured light projection system with an image capture element according to some embodiments of the present disclosure.

FIG. 1 shows a cross-sectional view of a structured light projection system 1000 according to some embodiments of the present disclosure. The structured light projection system 1000 includes a condenser lens group 1100, a light source 1200, a holder 1300, a mask 1400, an imaging component 1500, and an image capture element 1600 (FIG. 5).

As shown in FIG. 1, for purposes of illustration, the extending direction of the condenser lens group 1100 is referred to as a first direction D1, and the direction perpendicular thereto is referred to as a second direction D2.

According to some embodiments of the present disclosure, the condenser lens group 1100 includes a first end 1110, a second end 1120, a first area 1130, a second area 1140, a first lens 1150 and a second lens 1160.

According to some embodiments of the present disclosure, the first end 1110 and the second end 1120 of the condenser lens group 1100 are located at two opposite ends of the condenser lens group 1100. The first end 1110 and the second end 1120 are disposed along the first direction D1.

For purposes of illustration, the condenser lens group 1100 may be generally divided into two areas, the first area 1130 and the second area 1140. The first area 1130 and the second area 1140 are sequentially formed in the first direction D1.

According to some embodiments of the present disclosure, the first area 1130 is adjacent to the first end 1110. The second area 1140 is adjacent to the second end 1120. The first area 1130 and the second area 1140 are separated by the first lens 1150. The second lens 1160 is disposed at the second end 1120.

It should be understood that the proportions of the elements of the structured light projection system 1000 in FIG. 1 are provided for illustrative purposes only, for example, the distance between the first lens 1150 and the second lens 1160, that is, the length of the second area 1140 in the first direction D1, may be shorter than that shown in FIG. 1, and the actual proportion is set depending on product requirements.

According to some embodiments of the present disclosure, the light source 1200 and the first lens 1150 are located at opposite ends of the first area 1130, and the first lens 1150 and the second lens 1160 are located at opposite ends of the second area 1140.

According to some embodiments of the present disclosure, the light source 1200 is disposed at the first end 1110 of the condenser lens group 1100. The light source 1200 emits a light. In some embodiments of the present disclosure, the light source 1200 may be a light-emitting diode. The light emitted by the light source 1200 passes through the condenser lens group 1100, the mask 1400 and the imaging component 1500 in sequence.

In a specific embodiment, the first lens 1150 includes at least one lens, and the second lens 1160 includes at least one lens.

Figure 2:
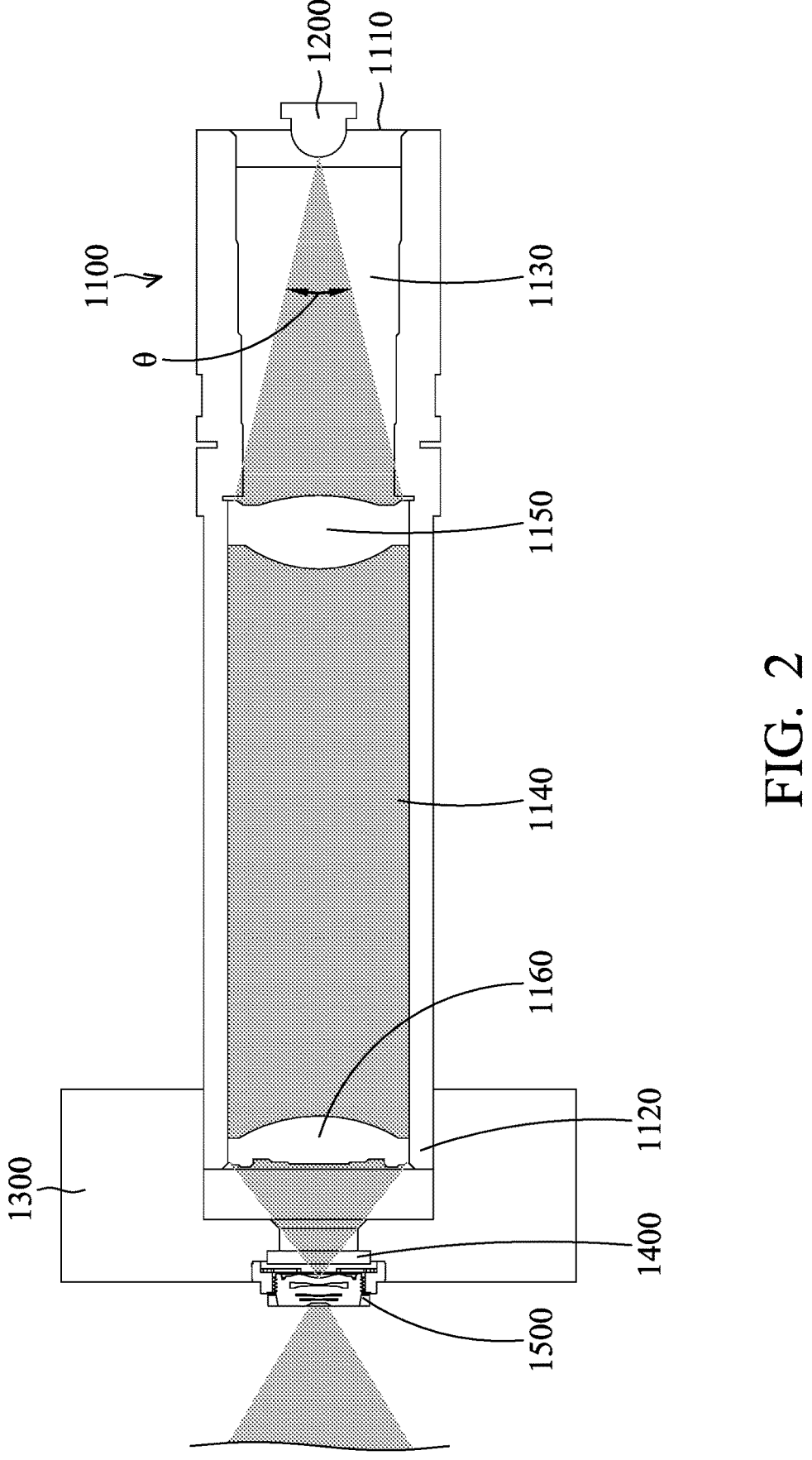
FIG. 2 is a schematic diagram of a light source emitting light in the structured light projection system.

Please refer to FIG. 2, which is a schematic diagram of light source 1200 emitting light in structured light projection system 1000. It should be understood that the light emitted by light source 1200 shown in FIG. 2 is provided for illustrative purposes only. In fact, in the case of using a high power LED, an emission angle $\theta$ of the light emitted by the light source 1200 is approximately in the range from 100 degrees to 160 degrees.

As shown in FIG. 2, the light emitted by the light source 1200 is converged by the first lens 1150 when passing through the first lens 1150. The light emitted by the light source 1200 is converged again by the second lens 1160 when passing through the second lens 1160.

In this way, With the light being converged by the first lens 1150 and the second lens 1160, the intensity of the light passing through the first lens 1150 and the second lens 1160 is enhanced, and the overflowing light is converged, thereby achieve the effects of adjusting the emission angle, uniform light distribution, and enhancing the overall luminous intensity.

Please refer back to FIG. 1, according to some embodiments of the present disclosure, the holder 1300 is disposed at the second end 1120 of the condenser lens group 1100. The holder 1300 holds the mask 1400 and the imaging component 1500. Details of the holder 1300 are described with reference to FIG. 4.

According to some embodiments of the present disclosure, the mask 1400 is disposed on the holder 1300. In particular, the mask 1400 is positioned at the focal plane of the lens. The condenser lens group 1100 condenses the light emitted by the light source 1200 on the mask 1400, and outputs or transfer the light in a specific pattern through the mask 1400, the details of which are described with reference to FIGS. 3A to 3D.

According to some embodiments of the present disclosure, the imaging component 1500 is disposed on the holder 1300. The imaging component 1500 projects the light passing through the mask 1400 onto a target element (FIG. 4), such as the surface of an object. Details of the imaging component 1500 are shown in FIG. 4.

Figures 3A, 3B, 3C, 3D:
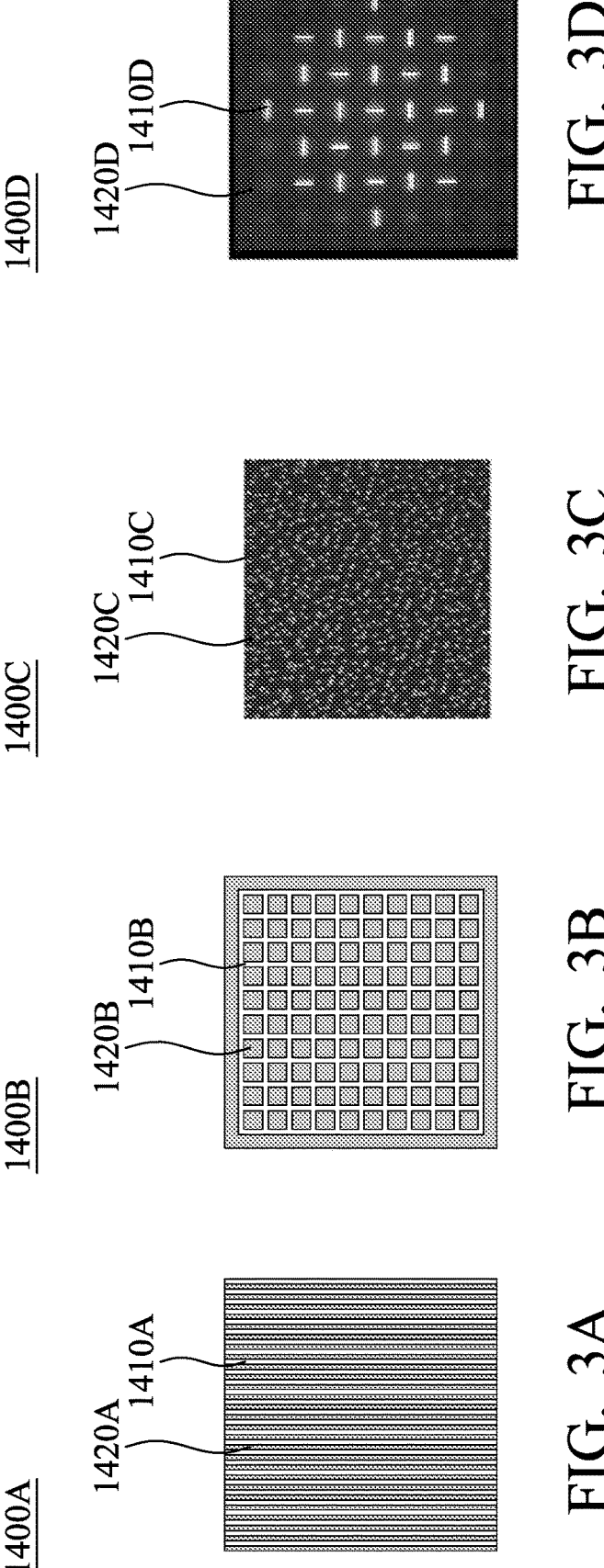
FIG. 3A is a schematic diagram of a mask according to an embodiment of the present disclosure.
FIG. 3B is a schematic diagram of a mask according to another embodiment of the present disclosure.
FIG. 3C is a schematic diagram of a mask according to another embodiment of the present disclosure.
FIG. 3D is a schematic diagram of a mask according to another embodiment of the present disclosure.

FIG. 3A is a schematic diagram of a mask 1400A according to an embodiment of the present disclosure. FIG. 3B is a schematic diagram of a mask 1400B according to another embodiment of the present disclosure. FIG. 3C is a schematic diagram of a mask 1400C according to another embodiment of the present disclosure. FIG. 3D is a schematic diagram of a mask 1400D according to another embodiment of the present disclosure.

Figure 4:
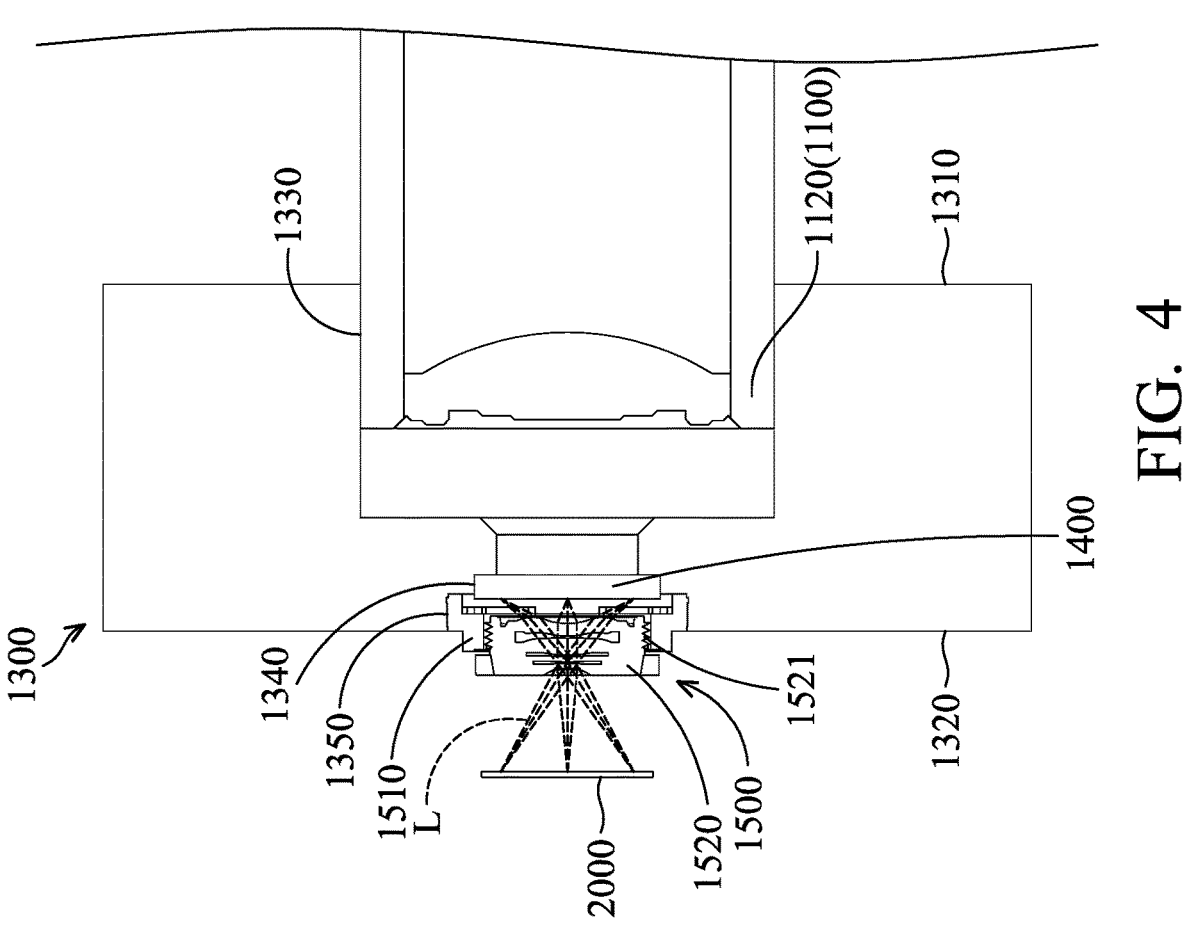
FIG. 4 shows a partial schematic diagram of a structured light projection system according to some embodiments of the present disclosure.

As shown in FIG. 3A, the mask 1400A includes a transparent area 1410A that allows light to pass through and a shielding area 1420A that blocks light from passing through, so that light passing through the mask 1400A forms a specific pattern on the target element (FIG. 4, FIG. 5). In the embodiment shown in FIG. 3A, this specific pattern is a stripe pattern.

Similarly, as shown in FIG. 3B, the mask 1400B includes a transparent area 1410B that allows light to pass through and a shielding area 1420B that blocks light from passing through, so that light passing through the mask 1400B forms a specific pattern on the target element (FIG. 4, FIG. 5). In the embodiment shown in FIG. 3B, this specific pattern is a checkerboard pattern.

Similarly, as shown in FIG. 3C, the mask 1400C includes a transparent area 1410C that allows light to pass through and a shielding area 1420C that blocks light from passing through, so that light passing through the mask 1400C forms a specific pattern on the target element (FIG. 4, FIG. 5). In the embodiment shown in FIG. 3C, this specific pattern is a speckle pattern.

Similarly, as shown in FIG. 3D, the mask 1400D includes a transparent area 1410D that allows light to pass through and a shielding area 1420D that blocks light from passing through, so that light passing through the mask 1400D forms a specific pattern on the target element (FIG. 4, FIG. 5).

In some embodiments of the present disclosure, the masks 1400A, 1400B, 1400C, 1400D may use quartz glass as a substrate. The shielding areas 1420A, 1420B, 1420C, 1420D of the masks 1400A, 1400B, 1400C, 1400D are coated with chromium metal for light-shielding purposes.

In some embodiments of the present disclosure, the transparent areas 1410A, 1410B, 1410C, 1410D of the masks 1400A, 1400B, 1400C, 1400D may be formed by laser etching.

In particular, in some embodiments of the present disclosure, computer-aided design (CAD) may be utilized for direct drawing to design the pattern to be projected by the structured light projection system Subsequently, laser etching may be employed to create transparent areas and shielding areas on chromium-coated quartz glass.

It should be understood that the present invention uses computer-aided design (CAD) direct drawing to design the pattern to be projected by the mask, so it should be readily understood that the projected pattern is not limited to the examples shown in FIGS. 3A to 3D. Rather, the projected pattern may be designed and adjusted according to user needs through computer-aided design (CAD).

In addition, the above method of using laser etching to process the mask is provided only as an example, and should not be taken as a limitation of the present invention. The mask of the present invention may also be processed and formed in other reasonable ways.

FIG. 4 shows a partial schematic diagram of a structured light projection system 1000 according to some embodiments of the present disclosure. As shown in FIG. 4, the light concentrated on the mask 1400 is projected to the target element 2000 with a specific pattern (i.e. structured light) via the imaging component 1500. The target element is, for example, the surface of an object.

It should be understood that the proportions of the optical path L passing through the imaging component 1500 and the target element 2000 shown in FIG. 4 are for illustrative purposes only, and are not drawn according to actual scale. In fact, the distance between the imaging component 1500 and the target element 2000 may be in a range of 5 cm to 50 cm, or any other range considered reasonable by those skilled in the art. In some embodiments, the distance between the imaging component 1500 and the target element 2000 may be 15 cm.

In some embodiments of the present disclosure, the holder 1300 includes a first surface 1310, a second surface 1320, a receiving portion 1330, a first holding portion 1340 and a second holding portion 1350.

In some embodiments of the present disclosure, the first surface 1310 and the second surface 1320 of the holder 1300 are two opposite surfaces of the holder 1300 that are both parallel to the second direction D2.

In some embodiments of the present disclosure, the receiving portion 1330 of the holder 1300 accommodates the second end 1120 of the condenser lens group 1100. In some embodiments of the present disclosure, the receiving portion 1330 of the holder 1300 is a recessed structure that is recessed from the first surface 1310 toward the first direction D1.

In some embodiments of the present disclosure, the first holding portion 1340 holds the mask 1400, and the second holding portion 1350 holds the imaging component 1500. The receiving portion 1330 and the second holding portion 1350 are positioned on opposite sides of the holder 1300.

In some embodiments of the present disclosure, the first holding portion 1340 is adjacent to the second holding portion 1350. In particular, the second holding portion 1350 is a recessed structure recessed from the second surface 1320 toward the negative direction of the first direction D1, and the first holding portion 1340 is a recessed structure recessed from the second holding portion 1350 toward the negative direction of the first direction D1.

In some embodiments of the present disclosure, the length of the first holding portion 1340 of the holder 1300 in the second direction D2 is smaller than the length of the second holding portion 1350 of the holder 1300 in the second direction D2.

Please continue to refer to FIG. 4, the imaging component 1500 includes a fixed portion 1510 and an imaging lens group 1520. The fixed portion 1510 of the imaging component 1500 is disposed on the second holding portion 1350 of the holder 1300.

In some embodiments of the present disclosure, the imaging lens group 1520 includes a thread 1521. The thread 1521 is in contact with the fixed portion 1510, and the imaging lens group 1520 is movable relative to the fixed portion 1510 with the thread 1521, thereby adjusting the distance between the imaging lens group 1520 and the target element 2000 to achieve better optical effects.

FIG. 5 is a schematic diagram of the structured light projection system 1000 with the image capture element 1600 according to some embodiments of the present disclosure. As shown in FIG. 5, the image capture element 1600 is disposed near the holder 1300. In some embodiments, the image capture element 1600 may be disposed on the holder 1300. The image capture element 1600 receives the light reflected from the target element 2000 to convert the received image into a digital signal. In a specific embodiment, the image capture element 1600 includes a charge-coupled device (CCD).

In summary, the structured light projection system of the present invention uses light-emitting diodes as the light source, concentrates the light emitted by the light source on the mask through the condenser lens group, and then projects the structured light with a specific pattern through the imaging component.

In contrast to the conventional technique where lasers are used as light sources to project onto diffractive optical elements (DOEs) in order to create structured light with specific patterns, the present invention employs light-emitting diodes (LEDs) as light sources. This results in the advantageous effects of achieving uniform overall brightness, distortion-free projections, and absence of laser speckle in the projected patterns, as compared to the known method.

Furthermore, the fabrication process of the mask in this invention is simpler compared to the prior art. Regarding the pattern design approach, the present invention enables direct drawing using computer-aided design (CAD) to create the patterns for projection, removing the need to design the projected patterns based on the derivation of wave optics equations from diffractive optical elements (DOEs) as required in the prior art.

While the invention has been shown and described with respect to one or more implementations, equivalents and modifications will occur to others skilled in the art upon the reading and understanding of this specification and the annexed drawings. Additionally, while specific features of the present invention may have been disclosed with respect to only one of several embodiments, for any given or specific application, such features, as necessary and advantageous, may be combined with one or more other features from other embodiments.

The terminology used herein is for the purpose of describing particular embodiments only and is not intended to be limiting of the invention. As used herein, the singular form "a, an, the" is intended to include the plural forms as well, unless the context clearly dictates otherwise. Furthermore, terms such as "including," "includes," "having," "has," or variations thereof, are employed in embodiments and/or claims for purposes of description, with such terms intending to encompass similarly phrased expressions in a manner similar to the term "including."

Unless otherwise defined, all terms (including technical and scientific terms) used herein have the same meaning as commonly understood by those skilled in the art. In addition, terms such as those defined in commonly used dictionaries should be interpreted as having meanings consistent with their meanings in the context of the relevant technical field, and will not be interpreted as idealized or overly formal meanings unless explicitly defined herein.

What is claimed is:

1. A structured light projection system, comprising:
   a condenser lens group, comprising a first end and a second end;
   a light source, disposed on the first end of the condenser lens group, and emitting a light;
   a mask;
   an imaging component, projecting the light passing through the mask onto a target element; and
   a holder, disposed on the second end of the condenser lens group, and holding the mask and the imaging component;
   wherein the light emitted by the light source sequentially passes through the condenser lens group, the mask and the imaging component;
   wherein the condenser lens group further comprises a first area, a second area, a first lens and a second lens, and the light source and the first lens are at opposite ends of the first area, and the first lens and the second lens are at opposite ends of the second area.

2. The structured light projection system as claimed in claim 1, wherein the light source is a light-emitting diode.

3. The structured light projection system as claimed in claim 1, further comprising an image capture element disposed near the holder to receive the light reflected from the target element.

4. The structured light projection system as claimed in claim 1, wherein the mask comprises a transparent area and a shielding area, wherein the transparent area allows the light to pass through, and the shielding area blocks the light from passing through, so that the light passing through the mask forms a specific pattern.

5. The structured light projection system as claimed in claim 4, wherein the specific pattern formed by the light passing through the mask is a stripe pattern or a checkerboard pattern.

6. The structured light projection system as claimed in claim 4, wherein the shielding area of the mask is coated with chromium metal.

7. The structured light projection system as claimed in claim 1, wherein the holder comprises a receiving portion, and the receiving portion accommodates the second end of the condenser lens group.

8. The structured light projection system as claimed in claim 7, wherein the holder further comprises a first holding portion and a second holding portion, the first holding portion holds the mask, the second holding portion holds the imaging component, the first holding portion is adjacent to the second holding portion, and the second holding portion and the receiving portion are located on opposite sides of the holder.

9. The structured light projection system as claimed in claim 1, wherein the imaging component comprises an imaging lens group and a fixed portion, the imaging lens group comprises a thread, the thread is in contact with the fixed portion, and the imaging lens group is movable relative to the fixed portion with the thread.

* * * * *